United States Patent
Liu (10) Patent No.: US 9,280,609 B2
(45) Date of Patent: Mar. 8, 2016

(54) EXACT MATCH LOOKUP SCHEME

(75) Inventor: Jian Liu, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1034 days.

(21) Appl. No.: 12/555,785

(22) Filed: Sep. 8, 2009

(65) Prior Publication Data

US 2011/0060876 A1    Mar. 10, 2011

(51) Int. Cl.
*G06F 12/10*     (2006.01)
*G06F 17/30*     (2006.01)
*H04L 12/54*     (2013.01)

(52) U.S. Cl.
CPC ...... *G06F 17/30949* (2013.01); *G06F 12/1018* (2013.01); *H04L 12/5689* (2013.01)

(58) Field of Classification Search
CPC ............... G06F 17/30949; G06F 17/30982; G06F 12/1018; H04L 45/7453; H04L 12/5689
USPC ............................. 709/238; 707/747; 711/216
See application file for complete search history.

(56) References Cited

U.S. PATENT DOCUMENTS

| | | | | |
|---|---|---|---|---|
| 5,920,900 A | * | 7/1999 | Poole et al. | 711/216 |
| 6,091,725 A | * | 7/2000 | Cheriton et al. | 370/392 |
| 6,690,667 B1 | * | 2/2004 | Warren | 370/389 |
| 6,735,670 B1 | * | 5/2004 | Bronstein et al. | 711/108 |
| 7,039,018 B2 | * | 5/2006 | Singh et al. | 370/255 |
| 7,107,258 B2 | * | 9/2006 | Cheng et al. | 707/698 |
| 7,809,701 B2 | * | 10/2010 | Blake | 707/698 |
| 2002/0172358 A1 | * | 11/2002 | Hurich | 380/37 |
| 2005/0141519 A1 | * | 6/2005 | Rajgopal et al. | 370/395.32 |
| 2008/0229056 A1 | * | 9/2008 | Agarwal et al. | 711/216 |

OTHER PUBLICATIONS

Javvin Technologies, Inc., Network Dictionary, May 2007, Javvin Press, p. 349.*

* cited by examiner

*Primary Examiner* — Christian P Chace
*Assistant Examiner* — Eric Loonan
(74) *Attorney, Agent, or Firm* — Bever, Hoffman & Harms, LLP (57) ABSTRACT

An exact match lookup system includes a hash function that generates a hash value in response to an input hash key. The hash value is used to retrieve a hash bucket index value from a hash bucket index table. The hash bucket index value is used to retrieve a plurality of hash keys from a plurality of hash bucket tables, in parallel. The retrieved hash keys are compared with the input hash key to identify a match. Hit logic generates an output index by concatenating the hash bucket index value with an address associated with the hash bucket table that provides the matching hash key. An exact match result is provided in response to the output index. A content addressable memory (CAM) may store hash keys that do not fit in the hash bucket tables.

22 Claims, 9 Drawing Sheets

EXACT MATCH LOOKUP SCHEME

FIELD OF THE INVENTION

The present invention relates to a hash-based exact match lookup scheme.

RELATED ART

Content addressable memory (CAM) arrays have been used to implement routing tables, wherein an exact match lookup is performed to by the CAM array to provide routing information in response to received packet information. However, CAM arrays exhibit a relatively low density compared to conventional random access memory (RAM), and are therefore relatively expensive. CAM arrays also exhibit a slower access time and higher power consumption than conventional RAM. However, CAM arrays advantageously exhibit a deterministic search latency, wherein an exact match lookup can typically be completed in one to two cycles. CAM arrays therefore exhibit a smaller search latency than an exact match lookup scheme implemented by conventional RAM (described below in FIGS. 1A-1B). However, large CAM arrays typically support fewer searches per second (i.e., operate at a lower clock frequency) than an exact match lookup scheme implemented by conventional RAM. Thus, CAM arrays typically provide a lower search throughput than an exact match lookup scheme implemented by conventional RAM.

Figure 1A:
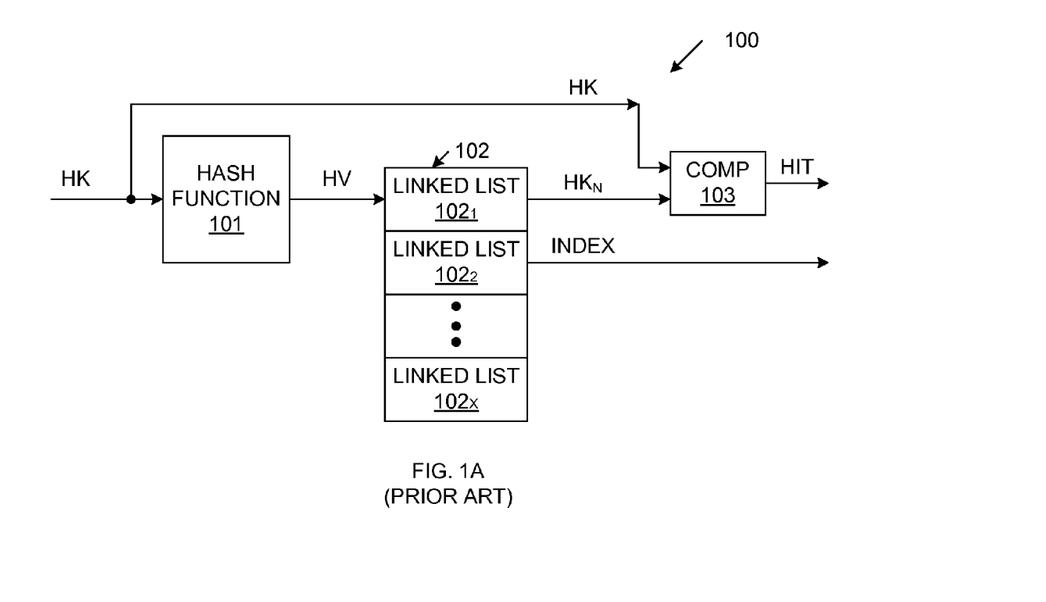
FIG. 1A is a block diagram of a conventional system that implements an exact match lookup scheme, without using a CAM array.

FIG. 1A is a block diagram of a conventional system 100 that implements an exact match lookup scheme, without using a CAM array. System 100 includes hash function block 101, linked lists 102 and comparator 103. Hash function block 101 performs a hash function on a received hash key HK (e.g., header information of a received packet), thereby generating a hash value HV. The hash value HV has fewer bits than the hash key HK. As a result, it is possible for the hash function to provide the same hash value HV in response to different hash keys HK. Linked lists 102, which may be implemented by conventional RAM, identify the hash keys associated with the hash values provided by hash function 101.

Figure 1B:
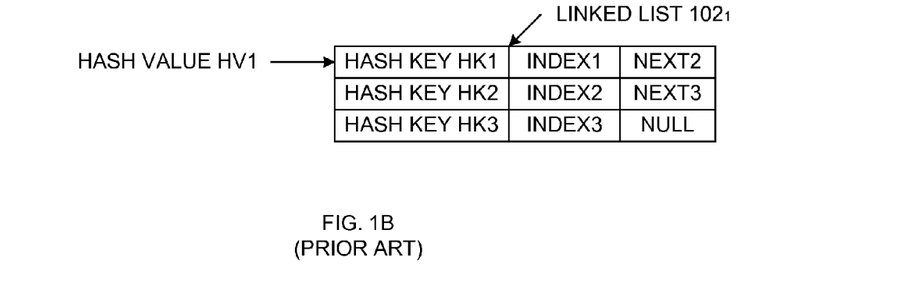
FIG. 1B is a block diagram illustrating an exemplary linked list associated with the conventional system of FIG. 1A.

FIG. 1B is a block diagram illustrating an exemplary linked list $102_1$ associated with a first hash value HV1. Note that each hash value may have an associated linked list. In the illustrated example, hash function block 101 provides the same hash value HV1 in response to a plurality of hash keys HK1, HK2 and HK3. The hash value HV1 points to the first entry of the linked list $102_1$, which includes the hash key HK1, an associated index value INDEX1 and a pointer NEXT2, which points to the second entry of the linked list $102_1$. The second entry of the linked list $102_1$ includes the hash key HK2, an associated index value INDEX2 and a pointer NEXT3, which points to the third entry of the linked list $102_1$. The third entry of the linked list $102_1$ includes the hash key HK3, an associated index value INDEX3, and a pointer NULL, which indicates that the third entry is the final entry of the linked list $102_1$.

When the hash function block 101 provides the hash value HV1, a system controller 'walks' the associated linked list $102_1$. More specifically, the hash key HK1 and the index value INDEX1 associated with the first entry of the linked list $102_1$ are retrieved. Comparator 103 determines whether the retrieved hash key HK1 matches the input hash key HK. If a match is detected, comparator 103 activates a hit signal HIT, and the associated index signal INDEX1 is provided as the result. If comparator 103 does not detect a match, then the system controller retrieves the hash key HK2 and the index value INDEX2 associated with the second entry of the linked list $102_1$ (using the pointer NEXT2), and the process is repeated. The system controller continues to 'walk' the linked list $102_1$, until a match is detected.

Note that system 100 has no deterministic search latency. That is, different hash keys may have different search latencies based on the link lists 102. In the example of FIG. 1B, hash key HK3 would have a longer search latency than hash keys HK1 and HK2, because this hash key HK3 is located lower in the link list $102_1$. It would therefore be desirable to have a hash-based exact match lookup scheme that implements conventional RAM and provides a deterministic search latency for all lookup operations.

SUMMARY

Accordingly, the present invention provides a hash-based exact match system that includes a hash function block that generates hash values in response to input hash keys, a hash bucket index table that provides hash bucket index values in response to the hash values provided by the hash function block, and a plurality of hash bucket tables, each capable of storing a plurality of hash keys. The plurality of hash bucket tables are read in parallel in response to each hash bucket index value. Each hash bucket index value thereby defines a corresponding hash bucket, wherein each hash bucket includes one entry in each of the hash bucket tables. Hash keys that result in the generation of a common hash value (i.e., hash keys that collide) are stored in a common hash bucket.

The system also includes a plurality of comparators, wherein each comparator receives the input hash key and an output hash key from a corresponding one of the hash bucket tables. Upon detecting a match, a comparator activates a corresponding hit signal. In response, hit logic generates an output index value that includes the hash bucket index value used to access the hash bucket tables, and a value that identifies the hash bucket table that provided the matching output hash key. The output index value is used to retrieve a result associated with the input hash key from an exact match result table.

Advantageously, the hash bucket index table, the hash bucket tables and the exact match result table can be implemented by RAM, such that no CAM is required to implement the hash-based exact match system. In an alternate embodiment, a small CAM may be used to allow the hash-based exact match system to flexibly resolve a number of hash collisions that exceeds the number of hash bucket tables.

The present invention will be more fully understood in view of the following description and drawings.

DETAILED DESCRIPTION

Figure 2:
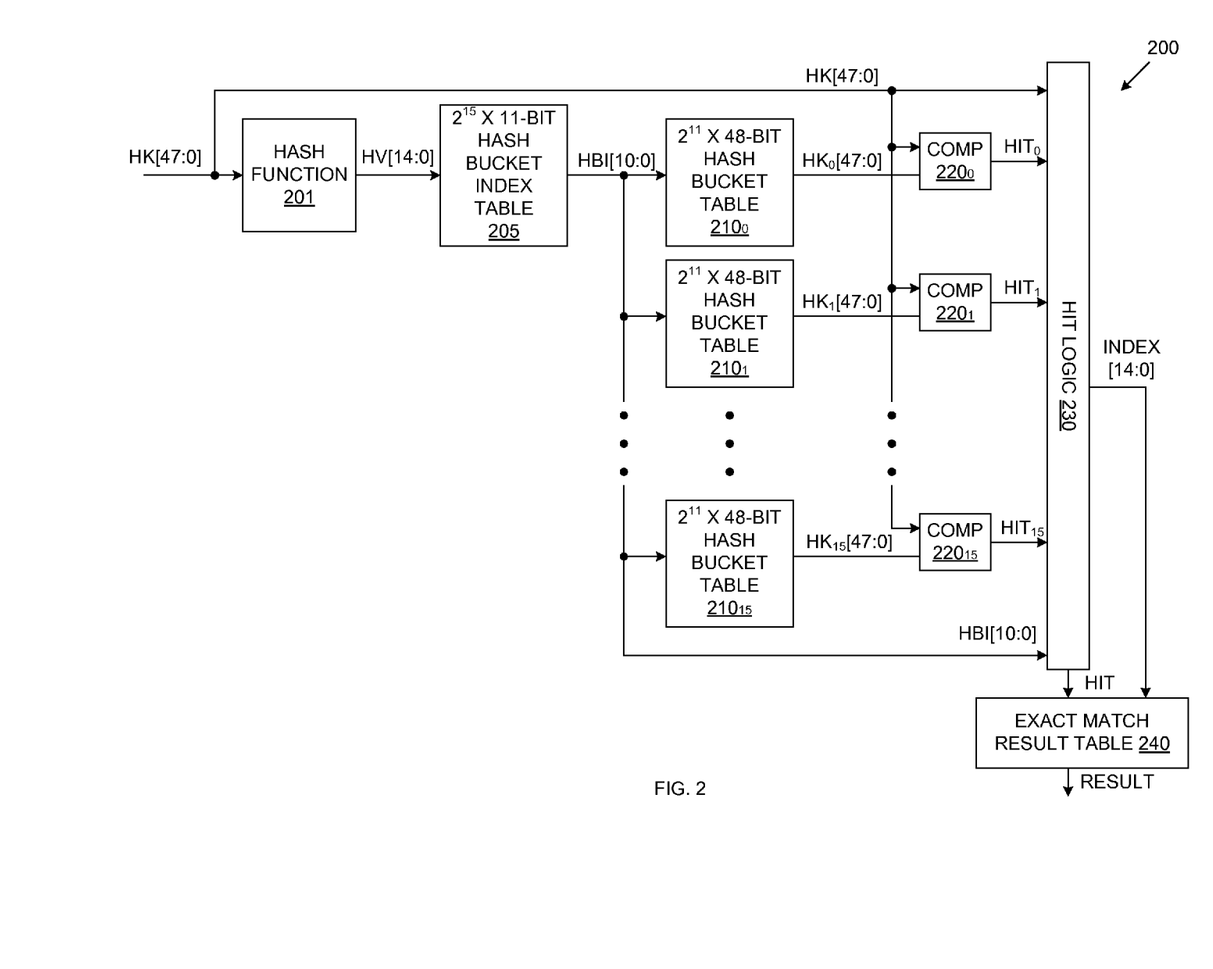
FIG. 2 is a block diagram of a hash-based exact match lookup system in accordance with one embodiment of the present invention.

FIG. 2 is a block diagram of a hash-based exact match lookup system 200 in accordance with one embodiment of the present invention. Exact match lookup system 200 includes hash function block 201, hash bucket index table 205, hash bucket tables $210_0$-$210_{15}$, comparators $220_0$-$220_{15}$, hit logic 230 and exact match result table 240.

An M-bit hash key is provided to hash function block 201. This M-bit hash key may be derived, for example, from the header of a packet to be routed by system 200. That is, the hash key may be generated by concatenating relevant header fields of a received packet, wherein most significant bit (MSB) locations are padded with '0' bits, as necessary, to create multiple bytes. In the described examples, the hash key is a 48-bit value, HK[47:0]. Although M is equal to 48 in the described examples, it is understood that M can have other values in other embodiments.

Hash function block 201 generates an N-bit hash value in response to the M-bit hash key, wherein M>N. In the described examples, hash function block 201 provides a 15-bit hash value HV[14:0] in response to a 48-bit hash key HK[47:0]. Although N is equal to 15 in the described examples, it is understood that N can have other values in other embodiments.

Hash function block 201 generates the hash value HV[14:0] by applying a conventional hash function to the received hash key HK[47:0]. For example, an Ethernet CRC checksum (CRC-32 based hash) may be used as the hash function. Because the hash function of the described examples requires less than 32 bits of output hash value (e.g., 15-bits), only the lower bits of the Ethernet CRC checksum are used in one embodiment of the present invention. To protect against malicious attacks, various bits of the hash key HK[47:0] may be scrambled (e.g., swapped) prior to applying the hash function.

The hash value HV[14:0] provided by hash function block 201 is used as an address to read hash bucket index table 205. Hash bucket index table 205 is a memory array that includes $2^N$ address locations (e.g., $2^{15}$ or 32K, address locations in the described examples). Thus, hash bucket index table 205 includes an address location associated with each of the possible hash values HV[14:0]. Each address location of hash bucket index table 205 is capable of storing a Z-bit hash bucket index value, wherein Z=11 in the present example. (Note that Z=N-$\log_2$(Y), wherein Y is equal to the number of hash bucket tables $210_0$-$210_{15}$.) Thus, hash bucket index table 205 provides an 11-bit hash bucket index value HBI[10:0] in response to the received 15-bit hash value HV[14:0]. In the described embodiments, hash bucket index table 205 is a static random access memory (SRAM), although this is not necessary.

The hash bucket index value HBI[10:0] identifies one of $2^{11}$ hash buckets, which are implemented by hash bucket tables $210_0$-$210_{15}$. Each of the $2^{11}$ hash buckets includes one entry in each of the hash bucket tables $210_0$-$210_{15}$, such that each hash bucket includes 16 entries.

Figure 4:
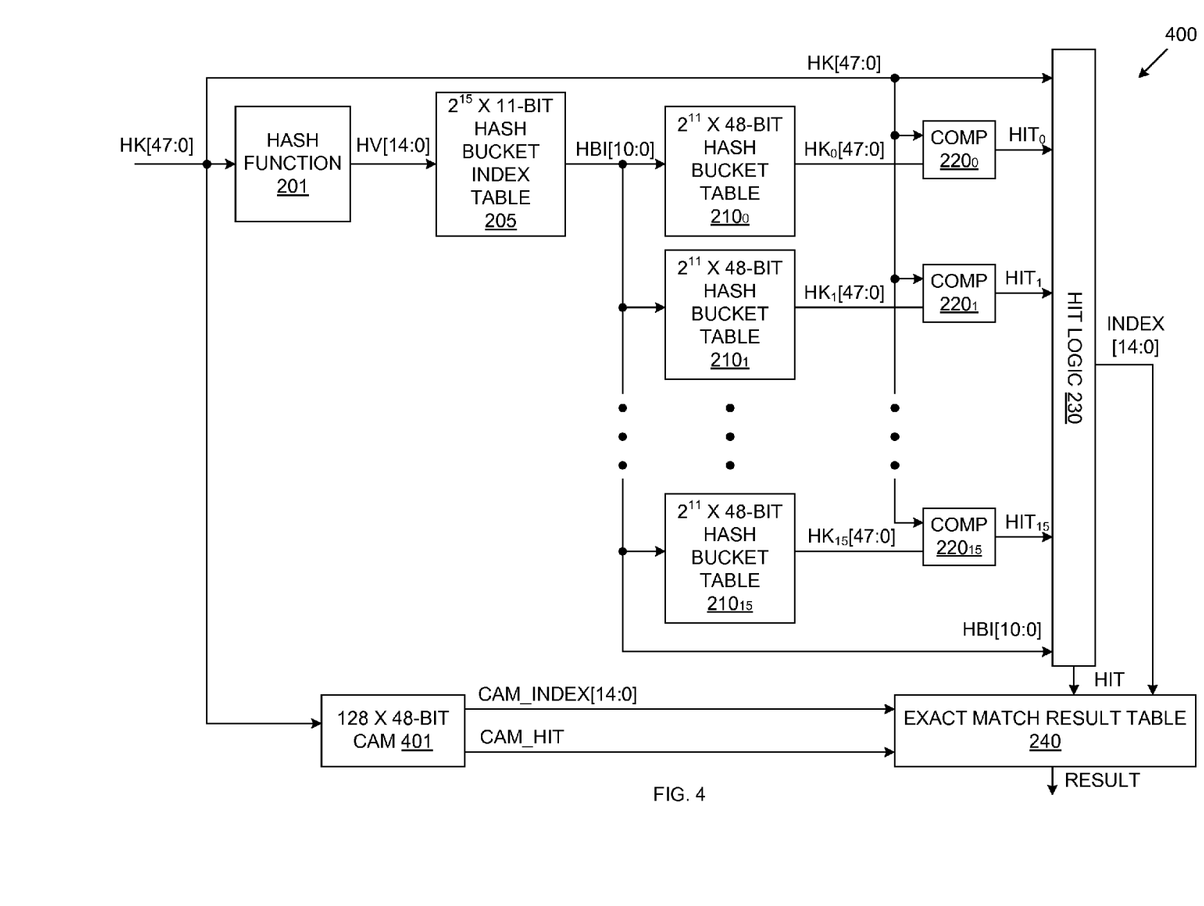
FIG. 4 is a block diagram of a hash-based exact match lookup system that implements a content addressable memory (CAM) in accordance with another embodiment of the present invention.

Although there are sixteen hash bucket tables $210_0$-$210_{15}$ in the described examples (Y=16), it is understood that other numbers of hash bucket tables can be used in alternate embodiments. The selection of the number of hash bucket tables is an engineering decision, wherein the selected configuration should operate reliably and be feasible to implement. In general, the number of hash bucket tables is selected in view of the hash function implemented by hash function block 201. For the 48-bit to 15-bit hash function used in the described examples, a simulation with random hash keys showed a 99.99% probability of eight or fewer collisions to any particular hash value. Thus, the chance of more than 8 collisions to any particular hash value is small. Providing sixteen entries in each hash bucket allows system 200 to resolve up to sixteen collisions to any particular hash value, and provides a high probability that system 200 can reliably operate in almost all hash collision scenarios. Providing sixteen entries in each hash bucket also provides system 200 with the flexibility to mix and match hash keys having different associated hash values within one hash bucket. As described in more detail below, if more than sixteen collisions to a particular hash value occur in system 200, system software may modify the hash function to reduce the number of collisions. Moreover, as described in more detail below, a small CAM may be provided to resolve more than sixteen collisions to a particular hash value (FIG. 4).

The 11-bit hash bucket index HBI[10:0] provided by hash bucket index table 205 is used as an address to simultaneously read sixteen 48-bit hash keys $HK_0$-$HK_{15}$ from hash bucket tables $210_0$-$210_{15}$, respectively. The sixteen hash keys $HK_0$-$HK_{15}$ represent the contents of a corresponding hash bucket. Each of the hash bucket tables $210_0$-$210_{15}$ has a capacity to store up to $2^z$ (e.g., $2^{11}$) 48-bit hash keys. In the described embodiments, each of the hash bucket tables $210_0$-$210_{15}$ is a static random access memory (SRAM), although this is not necessary.

Comparators $220_0$-$220_{15}$ receive the sixteen 48-bit hash keys $HK_0$-$HK_{15}$ read from hash bucket tables $210_0$-$210_{15}$, respectively. Comparators $220_0$-$220_{15}$ compare the received hash keys $HK_0$-$HK_{15}$ to the input 48-bit hash key HK[47:0]. If a match exists between the input hash key HK[47:0] and one of the retrieved hash keys $HK_0$-$HK_{15}$, the corresponding one of comparators $220_0$-$220_{15}$ activates a hit control signal $HIT_0$-$HIT_{15}$, respectively. The hit signals $HIT_0$-$HIT_{15}$ are provided to hit logic 230. Hit logic 230 receives the hit signals $HIT_0$-$HIT_{15}$, and in response, activates a hit output signal HIT if one of the hit signals $HIT_0$-$HIT_{15}$ is activated. Note that during any give cycle, at most, only one of the comparators $220_0$-$220_{15}$ should provide an activated hit signal. However, incorrect software programming (wherein the same hash key is written to the same address of two hash bucket tables) can result in multiple hit signals being activated. In this case, hit logic 230 effectively operates as a priority encoder, and always picks a 'winner' out of the sixteen hit signals $HIT_0$-$HIT_{15}$.

Hit logic 230 also receives the hash bucket index value HBI[10:0] from hash bucket index table 205. Upon receiving an activated hit control signal $HIT_X$ from comparator $220_X$, hit logic 230 activates the output hit signal HIT, and provides an output index signal INDEX[14:0], wherein bits [14:4] of the output index signal INDEX[14:0] are set equal to the hash bucket index HBI[10:0], and bits [3:0] of the output index signal are set equal to the 4-bit binary representation of the integer X. As a result, the output index signal INDEX[14:0] is unique to the input hash key HK[47:0].

Exact match result table 240 receives the HIT and INDEX [14:0] signals from hit logic 230, and in response, provides a lookup result, RESULT. For example, the RESULT provided by table 240 may include routing information associated with the received hash key HK[47:0].

Hash keys are added to system 200 in the following manner. A new hash key $HK_{NEW}[47:0]$ is provided to hash function block 201, which generates a corresponding hash value $HV_A[14:0]$. System software determines whether the new hash key $HK_{NEW}$ collides with any other hash key(s) previously stored in hash bucket tables $210_0$-$210_{15}$. That is, system software determines whether any hash key previously stored in hash bucket tables $210_0$-$210_{15}$ causes hash function block 201 to generate the same hash value $HV_A[14:0]$ as the new hash key $HK_{NEW}$. If the system software determines that the new hash key $HK_{NEW}$ does not collide with any other hash key(s) previously stored in hash bucket tables $210_0$-$210_{15}$, then the system software may store the new hash key $HK_{NEW}$ at any available location within the hash bucket tables $210_0$-$210_{15}$. For example, the system software may store the new hash key $HK_{NEW}$ at address location [000 0000 1001] within hash bucket table $210_1$. In this example, the system software also stores the address location [000 0000 1001] in hash bucket index table 205, at the address specified by the hash value $HV_A[14:0]$. The system software also stores the result ($HK_{NEW}$_RESULT) associated with the new hash key $HK_{NEW}$ at the address in exact match result table 240 associated with the INDEX value [000 0000 1001 0001].

When the hash key $HK_{NEW}[47:0]$ is subsequently applied to hash function block 201, the hash function block 201 responds by providing the hash value $HV_A[14:0]$ to hash bucket index table 205. In response, the address location within hash bucket index table 205 specified by the hash value $HV_A[14:0]$ is accessed, such that hash bucket index table 205 provides a hash bucket index value HBI[10:0] having a value of [000 0000 1001]. The address location [000 0000 1001] specified by the hash bucket index value HBI[10:0] is used to address hash bucket tables $210_0$-$210_{15}$. That is, the contents of the address location [000 0000 1001] of each of hash bucket tables $210_0$-$210_{15}$ are read out as hash key values $HK_0$-$HK_{15}$, respectively. Comparator $220_1$ detects that the retrieved hash key $HK_1$ matches the applied hash key $HK_{NEW}$, and in response, asserts the corresponding hit signal $HIT_1$. Hit logic 230 detects the asserted hit signal $HIT_1$, and in response, activates the output hit signal HIT, and provides an index value INDEX[14:0] having a unique value of [000 0000 1001 0001] (i.e., HBI[10:0] concatenated with '0001'). Exact match result table 240 provides the desired result $HK_{NEW}$_RESULT in response to this INDEX value (and the activated output hit signal HIT).

When adding the new hash key $HK_{NEW}$, the system software may determine that the new hash key $HK_{NEW}$ collides with one or more (but less than 16) hash keys previously stored in hash bucket tables $210_0$-$210_{15}$. In this case, the system software stores the new hash key $HK_{NEW}$ in the same hash bucket as the colliding hash key(s). For example, assume that the new hash key $HK_{NEW}$ collides with previously stored hash key $HK_1$ (i.e., $HK_{NEW}$ and $HK_1$ both hash to the same hash value, $HV_A[14:0]$). Further assume that hash key $HK_1$ has been stored at address location [000 0001 1101] in hash bucket table $210_0$. In this case, the system software would store the new hash key $HK_{NEW}$ at address location [000 0001 1101] in one of the hash bucket tables $210_1$-$210_{15}$ (assuming that one of these address locations is currently unused). For example, the system software may store the new hash key $HK_{NEW}$ at address location [000 0001 1101] within hash bucket table $210_1$. Note that in this example, the system software has previously stored the address value [000 0001 1101] in hash bucket index table 205, at the address location specified by the hash value $HV_A[14:0]$, during the process of adding the hash key $HK_1$ to system 200. Thus, the system software does not need to modify the hash bucket index table 205 when adding the hash key $HK_{NEW}$ in the present example. However, the system software must store the result ($HK_{NEW}$_RESULT) associated with the new hash key $HK_{NEW}$ at the address in exact match result table 240 associated with the INDEX value [000 0001 1101 0001].

In the previous example, it is possible that the address location [000 0001 1101] in each of the hash bucket tables $210_1$-$210_{15}$ already stores another hash key (i.e., the hash bucket is full) when attempting to add the new hash key $HK_{NEW}$. If at least one of these hash keys (e.g., hash key $HK_{NC}$ in hash bucket table $210_X$) does not collide with the new hash key $HK_{NEW}$, then the system software may move the non-colliding hash key $HK_{NC}$ to another hash bucket, and then add the new hash key $HK_{NEW}$ to the newly vacated location of the original hash bucket. Note that if the non-colliding hash key $HN_{NC}$ collides with other hash keys in the original hash bucket, these other hash keys would have to be moved to the same hash bucket as the non-colliding hash key $HK_{NC}$.

Figure 3A:
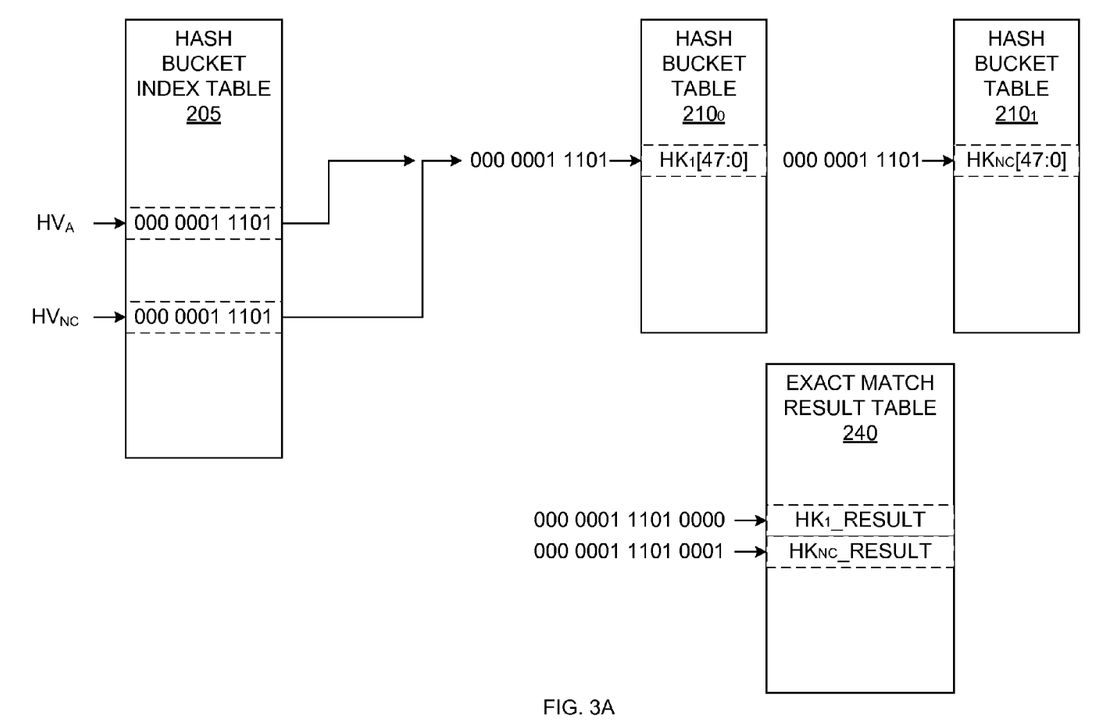
FIGS. 3A, 3B, 3C, 3D and 3E are block diagrams illustrating the manner in which a non-colliding hash key may be replaced by a colliding hash key within the hash-based exact match lookup system of FIG. 2, in accordance with one embodiment of the present invention.

FIGS. 3A, 3B, 3C, 3D and 3E are block diagrams illustrating the manner in which the non-colliding hash key $HK_{NC}$ may be replaced by the new (colliding) hash key $HK_{NEW}$. As illustrated in FIG. 3A, hash keys $HK_1[47:0]$ and $HK_{NC}[47:0]$ hash to different hash values $HV_A[14:0]$ and $HV_{NC}[14:0]$, respectively. However, the entries of hash bucket index table 205 specified by the hash values $HV_A$ and $HV_{NC}$ both store the same hash buffer index value of [000 0001 1101]. The address location [000 0001 1101] of hash bucket table $210_0$ stores the hash key $HK_1$, and the address location [000 0001 1101] of hash bucket table $210_1$ stores the non-colliding hash key $HK_{NC}$. Although not illustrated in FIG. 3A, the address location [000 0001 1101] of each of the remaining hash bucket tables $210_2$-$210_{15}$ store colliding or non-colliding hash values (i.e., the hash bucket associated with the address location [000 0001 1101] of hash bucket tables $210_0$-$210_{15}$ is full). The address location [000 0001 1101 0000] of exact match table 240 stores the result $HK_1$_RESULT associated with hash key $HK_1$, and the address location [000 0001 1101 0001] of exact match table 240 stores the result $HK_{NC}$_RESULT associated with hash key $HK_{NC}$.

Figure 3B:
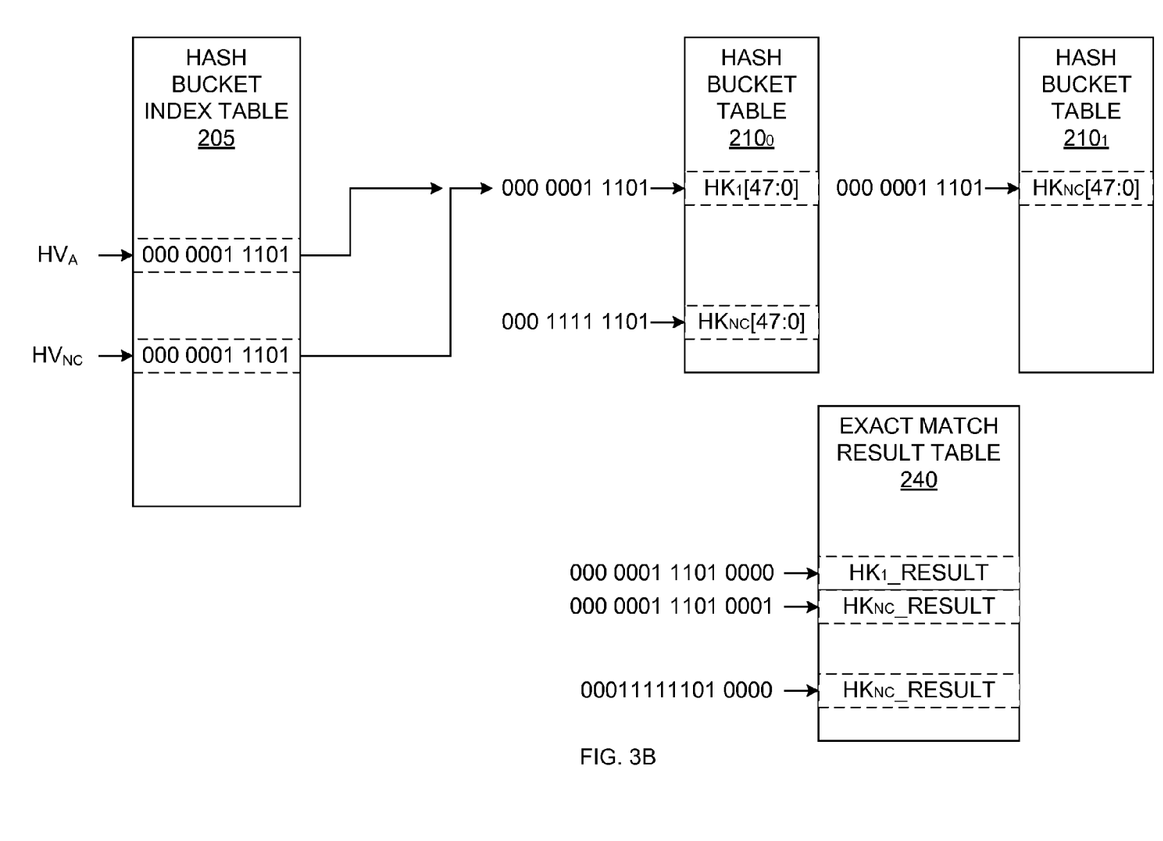

As illustrated in FIG. 3B, the non-colliding hash key $HK_{NC}$ is copied to a new location, which can be any free location within hash bucket tables $210_0$-$210_{15}$. In the illustrated example, the non-colliding hash key $HK_{NC}$ is copied to address location [000 1111 1101] of hash bucket table $210_0$. The result $HK_{NC}$_RESULT associated with the non-colliding hash key $HK_{NC}$ is also copied to the entry of the exact match table 240 that is associated with this new address location. In the illustrated example, the result $HK_{NC}$_RESULT associated with hash key $HK_{NC}$ is copied to address location [000 1111 1101 0000] of the exact match table 240. The steps illustrated in FIG. 3B can be performed in an arbitrary order.

Figure 3C:
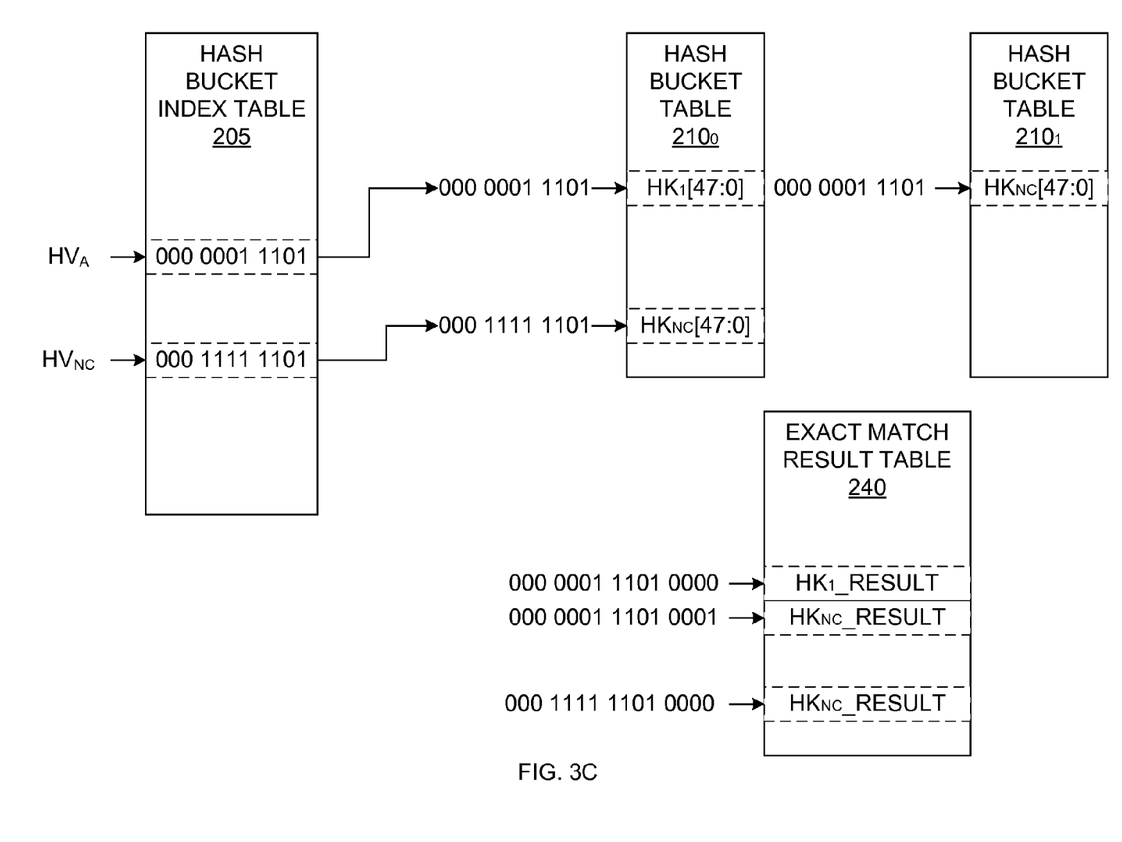

As illustrated in FIG. 3C, the entry of hash bucket index table 205 specified by the non-colliding hash value $HV_{NC}$ is updated to identify the new address location of the non-colliding hash key $HK_{NC}$. In the present example, the entry of hash bucket index table 205 specified by the non-colliding hash value $HV_{NC}$ is updated to store a hash bucket index value of [000 1111 1101]. As a result, the entry of hash bucket index table 205 specified by the non-colliding hash value $HV_{NC}$ properly points to the address location [000 1111 1101] of hash bucket $210_0$. Note that the hash bucket index table 205 is updated only after the steps of FIG. 3B are completed.

Figure 3D:
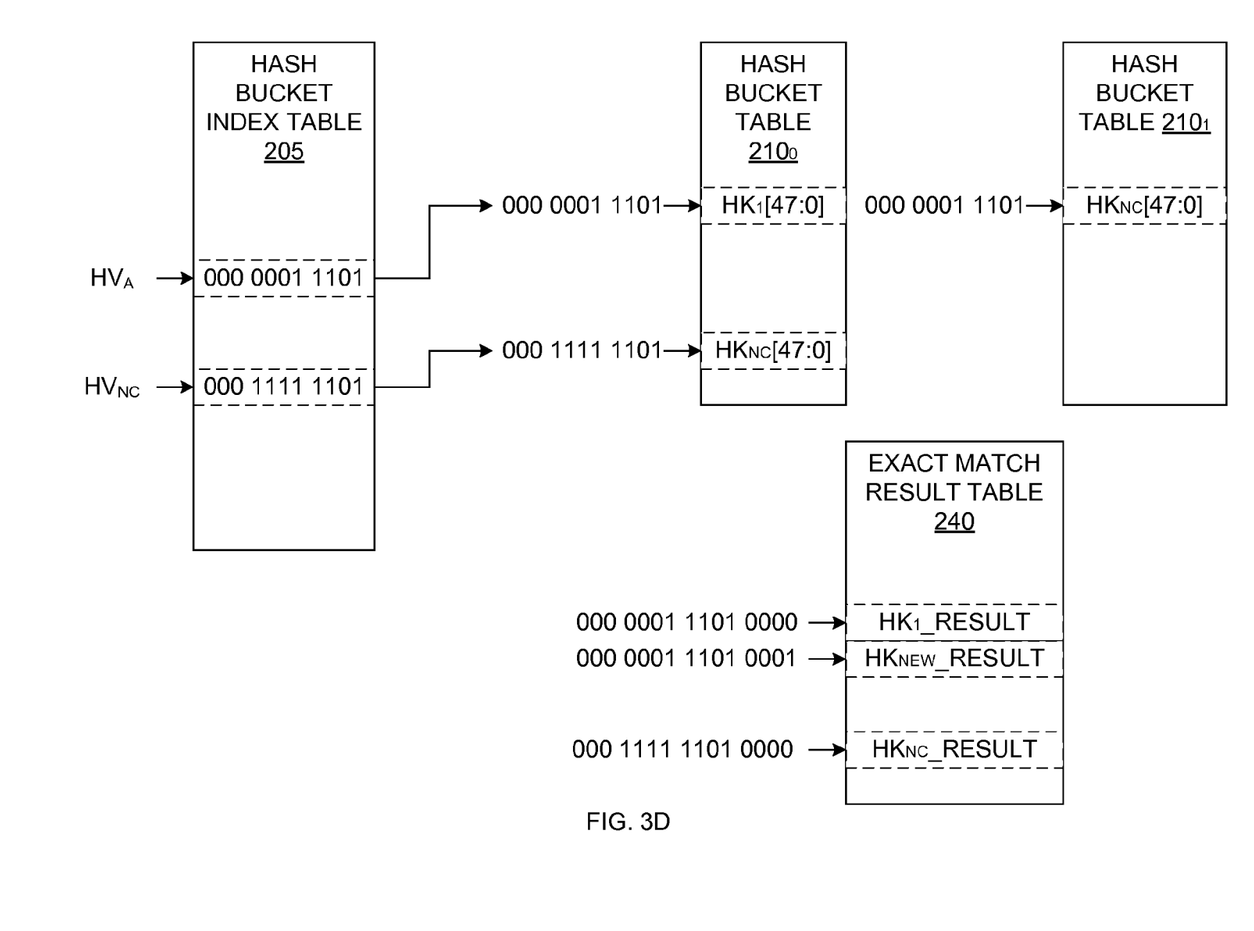

As illustrated in FIG. 3D, the result $HK_{NEW}$_RESULT associated with the new hash key $HK_{NEW}$ is added to the location of the exact match table 240 that was originally used to store the result $HK_{NC}$_RESULT associated with the non-colliding hash value $HV_{NC}$. Thus, in the present example, the result $HK_{NEW}$_RESULT associated with the new hash key $HK_{NEW}$ is written to location [000 0001 1101 0001] of exact match table 240.

Figure 3E:
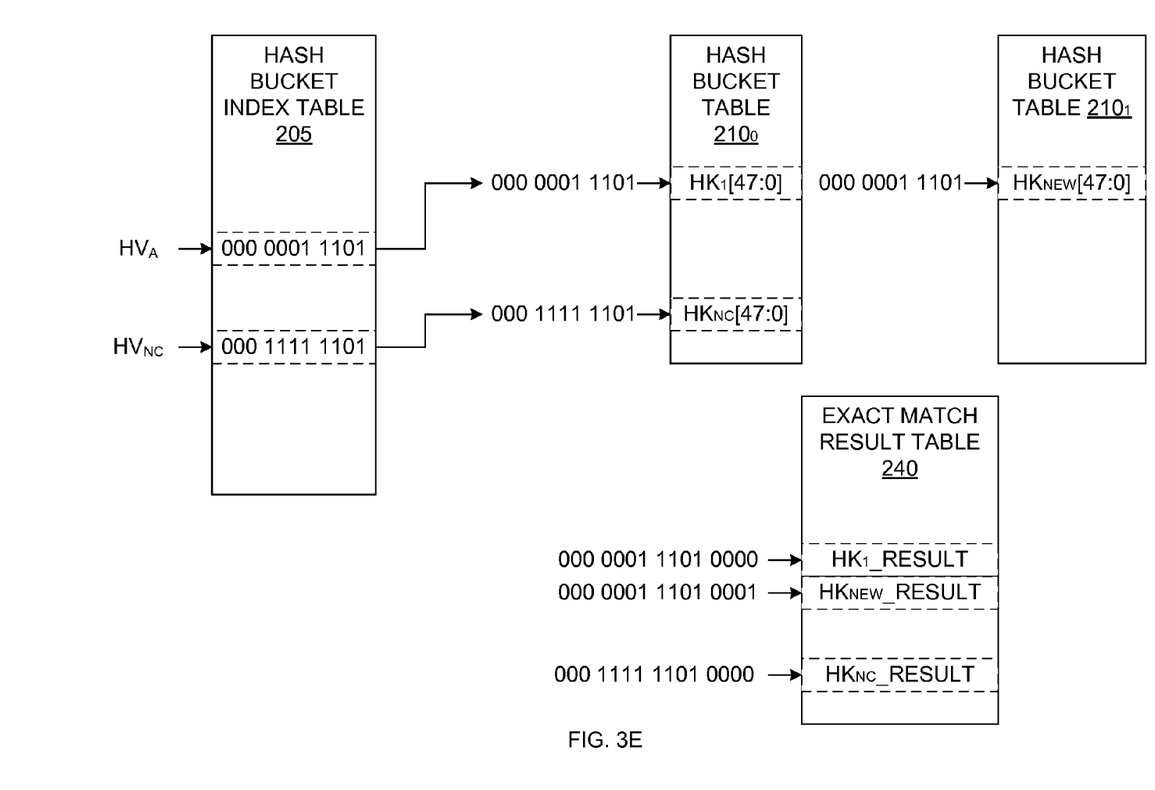

As illustrated in FIG. 3E, the new hash key $HK_{NEW}$ is then written to the location of the hash bucket table that originally stored the non-colliding hash key $HK_{NC}$. Thus, in the present example, the new hash key $HK_{NEW}$ is written to location [000 0001 1101] of hash bucket table $210_1$. Note that the above-described order of the steps of FIGS. 3A-3E ensure a 'wrong' decision can not be made during a software update of system 200.

Note that it is possible that the address location [000 0001 1101] in each of the hash bucket tables $210_0$-$210_{15}$ may store colliding hash keys (i.e., the hash bucket is full of sixteen colliding hash keys) when attempting to add the new hash key $HK_{NEW}$. In this case, the system software may modify the hash function implemented by hash function block 201 (e.g., by using a different hash key scramble value) in order to reduce the maximum number of hash collisions to sixteen or less for any given hash value. In an alternate embodiment, which is described below, a small content addressable memory (CAM) may be added to system 200, thereby enabling system 200 to resolve more than sixteen hash collisions to a single hash value.

FIG. 4 is a block diagram of a hash-based exact match lookup system 400 in accordance with an alternate embodiment of the present invention. Because exact match lookup system 400 is similar to exact match lookup system 200 (FIG. 2), similar elements are labeled with similar reference numbers in FIGS. 2 and 4. Exact match lookup system 400 therefore includes hash function block 201, hash bucket index table 205, hash bucket tables $210_0$-$210_{15}$, comparators $220_0$-$220_{15}$, hit logic 230 and exact match table 240, which are described above in connection with FIG. 2. In addition, exact match lookup system 400 includes CAM 401. As described in more detail below, CAM 401 allows system 400 to resolve more than sixteen collisions to a single hash value.

In the illustrated embodiment, CAM array 401 is capable of storing up to 128 48-bit hash keys, thereby allowing system 400 to resolve up to 128 more hash collisions than system 200. When the input hash key HK[47:0] matches a hash key stored in CAM 401, CAM 401 activates an associated hit signal, CAM_HIT, and provides an index value CAM_INDEX[14:0] associated with the matching hash key.

In one embodiment, CAM 401 is assigned the uppermost index address space. Thus, in the described examples, CAM 401 provides index values CAM_INDEX[14:0] that range from 32K-1 (i.e., '111 1111 1111 1111') to 32K-128 (i.e., '111 1111 1000 0000'). In this embodiment, the uppermost 8 entries in each of the hash bucket tables $210_0$-$210_{15}$ will have index values INDEX[14:0] that overlap the index values CAM_INDEX[14:0]. Thus, the system software does not use these uppermost 8 entries in hash bucket tables $210_0$-$210_{15}$ to store hash key values. Stated another way, the system software does not use the hash bucket index values of [111 1111 1000] to [111 1111 1111]. However, the system software may use the uppermost 8 entries in each of the hash bucket tables $210_0$-$210_{15}$ for other storage (unrelated to the exact match function). In an alternate embodiment, hash bucket tables $210_0$-$210_{15}$ may be modified, such that each of these hash bucket tables only includes 2040 entries.

If a hash bucket is full of sixteen hash keys that all collide to the same hash value $HV_A$, a seventeenth hash key $HK_{NEW}$ that collides to this same hash value $HV_A$ may be stored within CAM 401. When the hash key $HK_{NEW}$ is subsequently applied to CAM 401, CAM 401 activates the hit signal CAM_HIT to identify that a match exists, and provides an index value CAM_INDEX[14:0] that is specific to the storage location of the hash key $HK_{NEW}$ within CAM 401. For example, CAM 401 may provide a CAM_INDEX[14:0] having a value of [111 1111 1000 0000] upon detecting that the hash key $HK_{NEW}$ has been received. System software stores the result $HK_{NEW}$_RESULT associated with the hash key $HK_{NEW}$ within the exact match result table 240 at the address specified by this CAM_INDEX[14:0] value. Exact match result table 240 provides this result $HK_{NEW}$_RESULT as the output RESULT in response to receiving the activated CAM_HIT signal and a CAM_INDEX[14:0] having a value of [111 1111 1000 0000].

The 128 entries of CAM 401 may be flexibly distributed among the various hash buckets as required by the hashing function. For example, 128 of the hash buckets may be expanded by one entry each, or a single hash bucket may be expanded by 128 entries. One group of hash buckets may be expanded by one entry each, while another group of hash buckets may be expanded by two entries each, while still another group of hash buckets may be expanded by three entries each. The distributions of the entries of CAM 401 among the hash buckets are only limited by the number of entries in CAM 401. CAM 401 thereby adds great flexibility to system 400, while only slightly increasing the hardware requirements. Note that CAM 401 is significantly smaller than a CAM capable of detecting all of the exact match conditions associated with system 400.

If a new hash key $HK_{NEW}$ results in a hash collision that cannot be handled by hash bucket tables $210_0$-$210_{15}$ or CAM 401, the new hash key $HK_{NEW}$ cannot be added. In this case, the system software must modify the hash function implemented by hash function block 201 (e.g., by using a different hash key scramble value) in order to reduce the number of hash collisions to a level that can be properly resolved by hash bucket tables $210_0$-$210_{15}$ and CAM 401.

Figure 5:
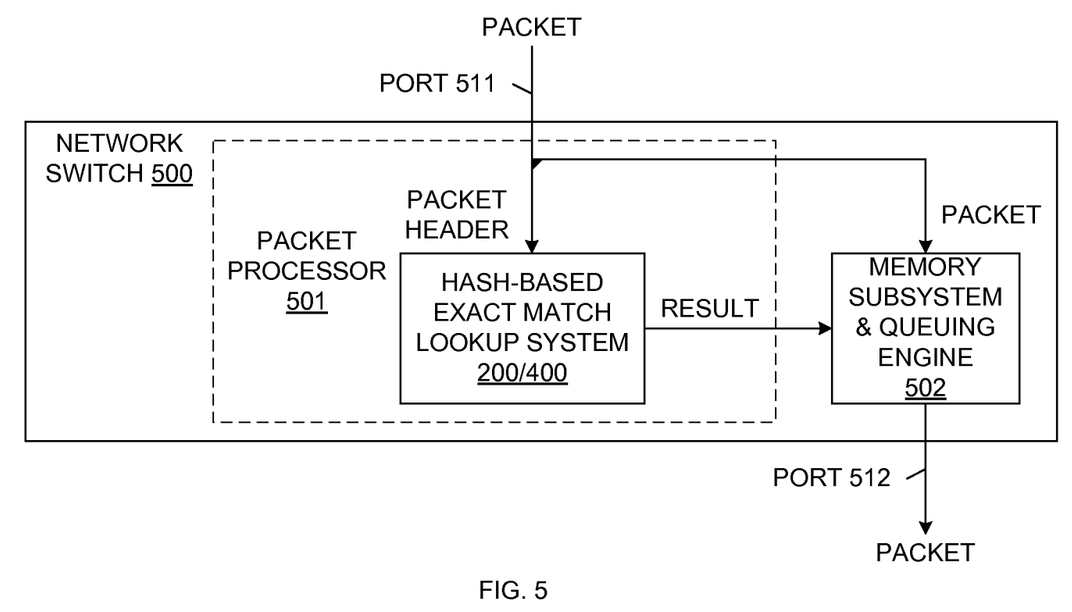
FIG. 5 is a block diagram illustrating a hash-based exact match lookup system of the present invention being used in a network switch.

FIG. 5 is a block diagram illustrating the hash-based exact match lookup system 200/400 being used in a network switch 500 in accordance with one embodiment of the present invention. In this embodiment, hash-based exact match lookup system 200/400 is included in a packet processor 501 of network switch 500. Note that the hash-based exact match lookup system is a building block within the packet processor 501, but is not the only element within the packet processor 501. For example, the packet processor 501 will typically include ternary CAMs (TCAMs) and various pipeline stages, which are not illustrated in FIG. 5. Also note that network switch 500 may also include an Ethernet MAC, which is not shown for purposes of clarity.

In one example, a packet received on a first port 511 of network switch 500 is provided to packet processor 501. Within packet processor 501, system 200/400 receives the packet header, and in response, generates the lookup result (RESULT) in the manner described above in connection with FIGS. 2 and 4. Both the received packet and the lookup result (RESULT) are provided to memory subsystem/queuing engine 502. Memory subsystem/queuing engine 502 selectively forwards the packet to an associated output port 512 of network switch 500 in response to the lookup result (RESULT). (Note that memory subsystem/queuing engine 502 is capable of forwarding packets to many other ports, which are not shown in FIG. 5).

Network switch 500 may be used in any packet switching application, such as, without limitation, Ethernet, IP, ATM, Fibre Channel, or Fibre Channel over Ethernet. Further, although an example of a network switch 500 is used, any network device or other computing device that has a need for an exact match lookup function may adapted to use the technology disclosed herein.

Although the present invention has been described in connection with various embodiments, it is understood that variations of these embodiments would be obvious to one of ordinary skill in the art. Thus, the present invention is limited only by the following claims.

I claim:

1. A lookup system comprising:
a hash function block that applies a hash function to an input hash key to generate a hash value, wherein the hash value is shorter than the input hash key;
a hash bucket index memory coupled to receive the hash value, wherein the hash bucket index memory provides a hash bucket index in response to the hash value;
a plurality of hash bucket memories, each coupled to receive the hash bucket index from the hash bucket index memory, and each providing an output hash key in parallel in response to the hash bucket index; and
circuitry for determining whether one of the output hash keys matches the input hash key,
wherein the lookup system identifies a match when one of the output hash keys matches the input hash key.

2. The lookup system of claim 1, wherein the circuitry for determining comprises a plurality of comparators, each coupled to receive an output hash key from a corresponding one of the hash bucket memories, and each coupled to receive the input hash key.

3. The lookup system of claim 1, wherein the hash value specifies an address location within the hash bucket index memory.

4. The lookup system of claim 1, wherein the hash bucket index value specifies an address location within each of the hash bucket memories.

5. A lookup system comprising:
a hash function block that applies a hash function to an input hash key to generate a hash value, wherein the hash value is shorter than the input hash key;
a hash bucket index memory coupled to receive the hash value, wherein the hash bucket index memory provides a hash bucket index in response to the hash value;
a plurality of hash bucket memories, each coupled to receive the hash bucket index from the hash bucket index memory, and each providing an output hash key in parallel in response to the hash bucket index;
a plurality of comparators, each coupled to receive an output hash key from a corresponding one of the hash bucket memories, and each coupled to receive the input hash key, wherein each of the comparators provides a corresponding hit signal that is activated when the output hash key received by the comparator matches the input hash key.

6. The lookup system of claim 5, further comprising hit logic coupled to receive the hash bucket index and the hit signal from each of the comparators.

7. The lookup system of claim 6, wherein the hit logic provides an output index value that includes the hash bucket index concatenated with a value that identifies one of the comparators that activates a corresponding hit signal.

8. The lookup system of claim 7, further comprising a result memory coupled to receive the output index value, wherein the result memory provides a lookup result in response to the output index value.

9. The lookup system of claim 8, further comprising a content addressable memory (CAM) that provides a CAM hit signal and a CAM index value in response to the input hash key, wherein the result memory provides the lookup result in response to the CAM hit signal and the CAM index value.

10. A lookup system comprising:
a hash function block that applies a hash function to an input hash key to generate a hash value, wherein the hash value is shorter than the input hash key;
a hash bucket index memory coupled to receive the hash value, wherein the hash bucket index memory provides a hash bucket index in response to the hash value;
a plurality of hash bucket memories, each coupled to receive the hash bucket index from the hash bucket index memory, and each providing an output hash key in parallel in response to the hash bucket index; and
a content addressable memory (CAM) that provides a CAM hit signal and a CAM index value in response to the input hash key.

11. The lookup system of claim 10, wherein the CAM includes N entries and each of the hash bucket memories includes M entries, wherein M is greater than N.

12. The lookup system of claim 11, wherein M is at least 10 times greater than N.

13. A method of performing an exact match lookup comprising:
performing a hash function on an input hash key, thereby creating a hash value, wherein the hash value is shorter than the input hash key;
accessing a hash bucket index table in response to the hash value, wherein a hash bucket index is retrieved from the hash bucket index table; and
accessing a plurality of hash bucket tables in parallel in response to the hash bucket index, wherein an output hash key is retrieved from each of the hash bucket tables;
comparing the input hash key with the output hash key retrieved from each of the hash bucket tables; and
identifying an exact match when an output hash key retrieved from a first hash bucket table matches the input hash key.

14. A method of performing an exact match lookup comprising:
performing a hash function on an input hash key, thereby creating a hash value, wherein the hash value is shorter than the input hash key;
accessing a hash bucket index table in response to the hash value, wherein a hash bucket index is retrieved from the hash bucket index table;
accessing a plurality of hash bucket tables in parallel in response to the hash bucket index, wherein an output hash key is retrieved from each of the hash bucket tables;
comparing the input hash key with the output hash key retrieved from each of the hash bucket tables; and
activating a first hit signal when an output hash key retrieved from a first hash bucket table matches the input hash key.

15. The method of claim 14, further comprising generating an output index value in response to the first hit signal, wherein the output index value includes the hash bucket index concatenated with a value that identifies the first hash bucket table.

16. The method of claim 15, further comprising providing a lookup result in response to the first hit signal and the output index value.

17. The method of claim 16, further comprising:
accessing a content addressable memory (CAM) in response to the input hash key, wherein the CAM provides a CAM hit signal that indicates whether the input hash key matches an entry of the CAM, and a CAM index value; and providing the lookup result in response to the CAM hit signal and the CAM index value.

18. A method of performing an exact match lookup comprising:

performing a hash function on a plurality of hash keys, wherein each of the hash keys provides a corresponding hash value, wherein each hash value is shorter than the corresponding hash key;

determining that a first set of the hash keys all provide a first hash value; and storing the first set of hash keys in a plurality of different hash bucket tables, wherein each of the first set of hash keys is addressable by a common first address;

retrieving the first set of hash keys from the plurality of different hash bucket tables in response to an input hash key;

comparing the input hash key with each hash key of the retrieved first set of hash keys; and indicating an exact match in response to the input hash key matching a hash key of the retrieved first set of hash keys.

19. The method of claim 18, further comprising storing the first address in a hash bucket index table at an address specified by the first hash value.

20. The method of claim 18, further comprising:

determining that a second set of the hash keys all provide a second hash value; and storing the second set of hash keys in a plurality of different hash bucket tables, wherein each of the second set of hash keys is addressable by a common second address retrieving the second set of hash keys from the plurality of different hash bucket tables in response to a second input hash key;

comparing the second input hash key with each hash key of the retrieved second set of hash keys; and indicating an exact match in response to the second input hash key matching a hash key of the retrieved second set of hash keys.

21. The method of claim 20, further comprising:

storing the first address in a hash bucket index table at an address specified by the first hash value; and storing the second address in the hash bucket index table at an address specified by the second hash value.

22. The method of claim 21, further comprising:

determining that a second set of one or more hash keys all provide the first hash value; and storing the second set of one or more hash keys in a content addressable memory array.

* * * * *